United States Patent [19]

Masuda

[11] Patent Number: 4,777,831
[45] Date of Patent: Oct. 18, 1988

[54] APPARATUS FOR MEASURING LIFTER PRESSURE

[75] Inventor: Masayuki Masuda, Sagamihara, Japan

[73] Assignee: Daiwa Can Company, Limited, Tokyo, Japan

[21] Appl. No.: 580

[22] Filed: Jan. 2, 1987

[51] Int. Cl.$^4$ .................. G01L 5/00; B21D 51/26
[52] U.S. Cl. .................. 73/862.54; 73/862.65; 413/27
[58] Field of Search .......... 73/862.53, 862.54, 862.55, 73/862.65, 862.67; 413/27

[56] References Cited

U.S. PATENT DOCUMENTS

| | | | |
|---|---|---|---|
| 2,472,047 | 5/1949 | Ruge | 73/862.65 X |
| 3,132,268 | 5/1964 | Abel et al. | |
| 3,213,678 | 10/1965 | Abel | |
| 3,246,511 | 4/1966 | Abel | |
| 3,826,130 | 7/1974 | Pusch | |
| 4,205,617 | 6/1980 | Chmielowiec | 413/27 |
| 4,257,341 | 3/1981 | Roberts | 413/27 |
| 4,366,874 | 1/1983 | Pidoux et al. | 73/862.67 X |
| 4,600,347 | 7/1986 | Segredo et al. | |

FOREIGN PATENT DOCUMENTS

| | | |
|---|---|---|
| 1203983 | 11/1966 | Fed. Rep. of Germany . |
| 1573936 | 1/1971 | Fed. Rep. of Germany . |
| 2202105 | 8/1973 | Fed. Rep. of Germany . |
| 3441847 | 5/1986 | Fed. Rep. of Germany . |

*Primary Examiner*—Charles A. Ruehl
*Attorney, Agent, or Firm*—Wenderoth, Lind & Ponack

[57] ABSTRACT

An apparatus for measuring the lifter pressure of a seamer for doubly seaming a can end to a can barrel by clamping a body of the apparatus between a lifter plate and a seaming chuck and elongating the body to a predetermined extent, wherein pressure is detected by a load cell, the pressure is transmitted as an electric signal and the pressure is digitally displayed.

11 Claims, 3 Drawing Sheets

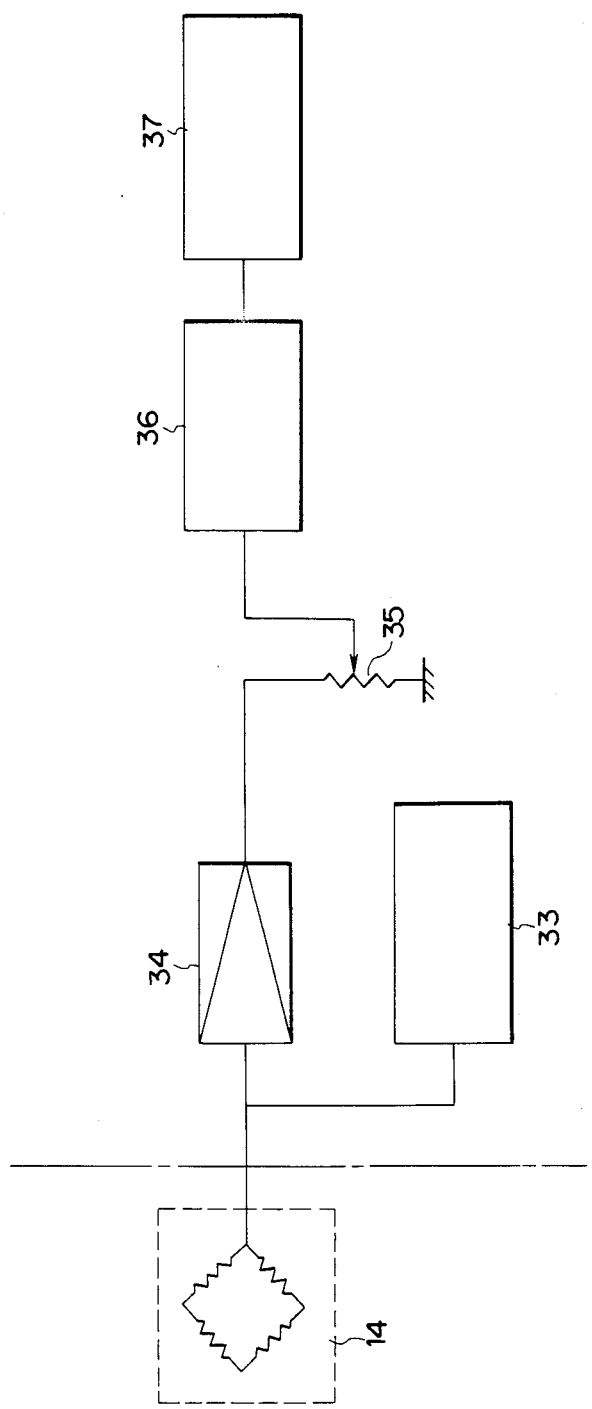

4,777,831

APPARATUS FOR MEASURING LIFTER PRESSURE

TECHNICAL FIELD OF THE INVENTION

This invention relates to improvements in an apparatus for measuring the lifter pressure in a seamer for doubly seaming a can end to a can barrel.

BACKGROUND OF THE INVENTION

With a seamer for doubly seaming a can end to a can barrel, the can end is fitted on the can barrel, then the can barrel and can end are raised by a lifter to secure the can end in a state pressed against a seaming chuck, and a seaming roll moving around the can while it is rotating is gradually brought closer to a flange of the can barrel and curl portion of the can end, thereby forming a double seam. In this operation, if the lifter pressure with which the can barrel and can end are raised by the lifter is insufficient, overlapped portions of the can barrel and can end at the double seamed portion have an insufficient length, so that the finished can is prone to leakage. If the lifter pressure is excessive, on the other hand, the overlapped portion of the can end has an insufficient length, thus resulting in a double seam in which the end of the can barrel abuts the can end. In this case, not only is the finished can prone to leakage, but also the can end is liable to be cracked in a portion where the end of the can barrel abuts the can end.

Therefore, it is necessary to control the lifter pressure to a proper value at all time. To this end, there is an apparatus of the hydraulic oil type for measuring the lifter pressure.

This hydraulic oil apparatus for the lifter pressure measurement comprises a vessel assembled in a body of the apparatus, expandable and contractive in the direction of pressure application, and filled with oil; a mechanism for causing expansion and contraction of the body in the direction of pressure application; a member for transmitting the pressure applied to the body to the vessel at all time; and a Bourdon pressure gauge connected by a tubeline to the vessel in the body. A pressure applied to the body is thus transmitted to the vessel to cause deformation of the vessel. In consequence, oil is caused to enter the pressure gauge, whereby the applied pressure is displayed on the gauge.

In a method of measuring the lifter pressure using this hydraulic oil lifter pressure measurement apparatus, the body is clamped between the lifter and chuck, and the body is elongated to a predetermined extent from a start point of measurement right before the pressure gauge pointer starts movement. The lifter pressure is measured from the difference of the reading at the start point of measurement of the pressure gauge and the reading after the expansion to the predetermined extent.

With the prior art hydraulic oil lifter pressure measurement apparatus, which has the above construction and adopts the above method of measurement, the values measured do not vary linearly on the basis of a spring constant but great errors result due to such causes as defective deformation or restoration of the vessel filled with oil, oil leakage from the vessel and tubelines, defective deformation of the elastically expandable and contractive portion of the Bourdon pressure gauge due to fatigue, changes in the oil volume with temperature changes and changes in the oil volume due to intrusion of air, etc.

Further, errors are liable to the reading of the pressure gauge pointer depending on the level of the eyes.

SUMMARY OF THE INVENTION

An object of the invention, accordingly, is to improve the drawbacks noted above.

Another object of the invention is to provide a lifter pressure measurement apparatus, which can eliminate or alleviate the eccentricity of a body of the apparatus clamped eccentrically between a lifter and a chuck, thus eliminating or reducing an otherwise possible error of the measurement.

A further object of the invention is to provide a lifter pressure measurement apparatus, which permits the body to be clamped between the lifter and chuck without eccentricity.

A still further object of the invention is to provide a lifter pressure measurement apparatus, which can be used for any seamer having any size without alteration of the body.

The apparatus according to the invention is obtained by improving a prior art pressure display system, which is based on the sensing of hydraulic oil pressure, transmission of hydraulic oil pressure to a pressure gauge and pointer display of the pressure, into a system, which is based on the sensing of pressure by a load cell which is one of the recently extremely developed sensors, transmission of the pressure as an electric signal and digital display of the pressure.

Further, with the apparatus according to the invention, in order to prevent the body of the apparatus from being clamped eccentrically between the lifter and chuck and to make it possible that the apparatus is applicable to a seamer of any size, a seaming chuck adapter is clamped between the body and chuck, and a fitting structure is provided between the lower surface of the seaming chuck adapter and the upper surface of the body for aligning the axes of the chuck and body.

Further, in order to alleviate the eccentricity, i.e., deviation, of the load resulting from a distorted fitting of the fitting structure, a rod for transmitting a load to the load cell is supported near its center and lower end, respectively, by leaf springs.

BRIEF DESCRIPTION OF THE DRAWINGS

FIG. 3 is a block diagram showing a circuit for processing an electric signal from a load cell and displaying the result of processing.

PREFERRED EMBODIMENT OF THE INVENTION

Figure 1:
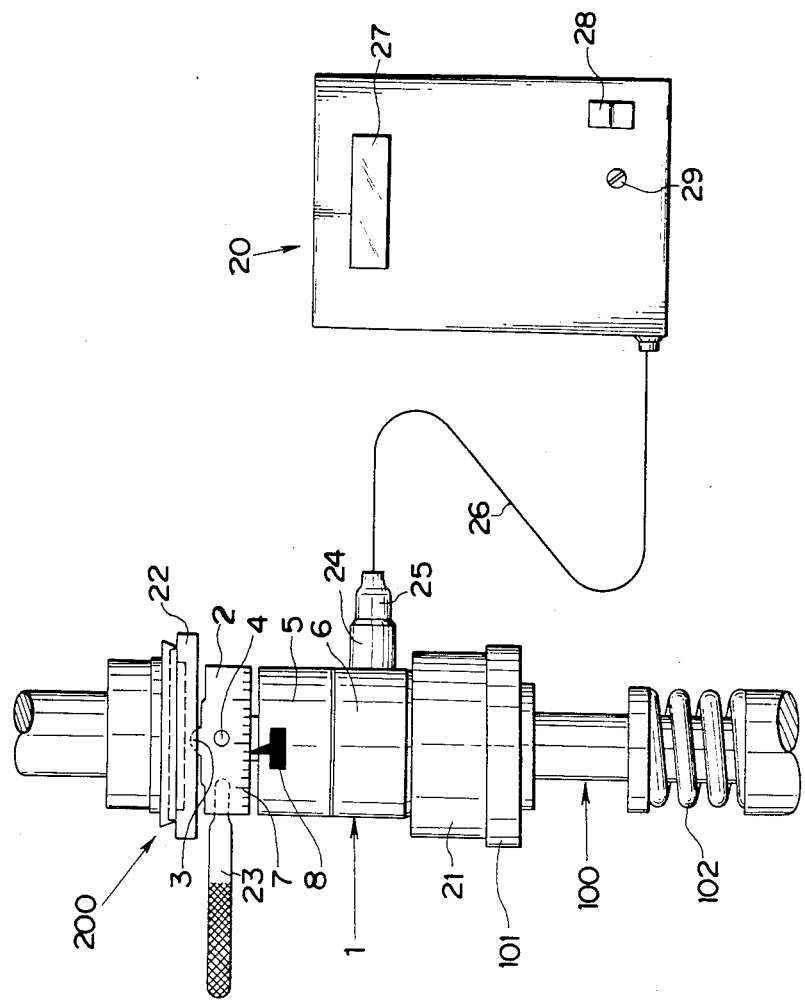
FIG. 1 is a schematic representation of the apparatus according to the invention in a state clamped between lifter and chuck in use.
Figure 2:
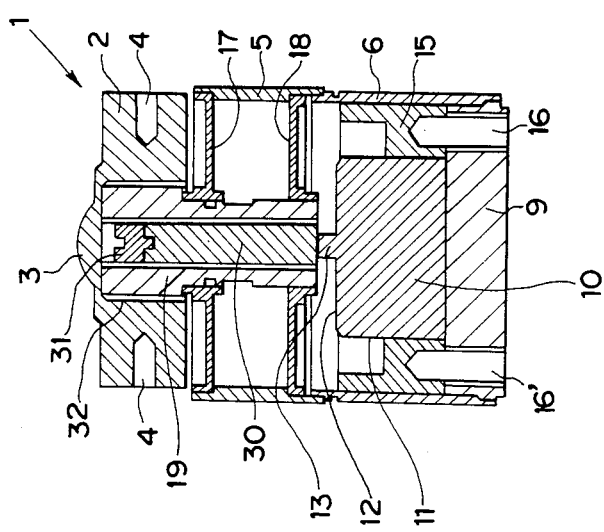
FIG. 2 is a sectional view showing a body of the apparatus.

FIG. 1 shows an embodiment of the apparatus according to the invention in a state, in which it is clamped between a lifter and a chuck in use, and FIG. 2 is a sectional view showing a body of the apparatus according to the invention. Referring to FIG. 1, reference numeral 100 designates a lifter for a seamer, which obtains a lifter pressure as a reaction force by compressing a lifter spring 102. Reference numeral 200 designates a seaming chuck of a seamer. Reference numeral 1 designates a cylindrical body of the apparatus according to the invention. Reference numeral 101 designates a lifter plate, on which is mounted a height adjustment spacer such that any can height, i.e., any distance between the lifter plate 101 and seaming chuck 200, can be corresponded. Therefore, a plurality of spacers 21 having different heights are prepared to meet various can heights. In the case of a seamer which is remodeled for a small can height, the spacer 21 may be omitted, and the body 1 of the apparatus may be mounted on the lifter plate 101. Reference numeral 22 designates a seaming chuck adapter. Its top portion is fitted on the seaming chuck 200, and its bottom is provided with, for example, a recess fitted on a projection 3 or the like provided on top of a load receptacle 2 of the body 1. With this arrangement, the axis of the body 1 coincides with the axes of the lifter 100 and chuck 200. Since the diameter of the chuck 200 is varied depending on the diameter of the can end to be seamed, a plurality of adapters 22 having different diameters are provided. Reference numeral 23 designates a receptacle rotation pin, which is used to manually rotate the load receptacle 2 by inserting it into a hole 4 formed in the load receptacle 2. Reference numerals 5 and 6 designate upper and lower covers of the body 1, respectively. Reference numeral 7 designates a scale provided over the entire periphery of the load receptacle 2. The scale 7 in cooperation with a mark 8 on the upper cover 5 permits the extent of axial movement of the receptacle to be determined when the receptacle 2 is rotated with the pin 23. The lower cover 6 is provided with a receptacle 24 communicating with a load cell 10 for outputting an electric signal therefrom, to be described later. By inserting a plug 25 into the receptacle 24, the body 1 is connected by a cord 26 to a display unit 20, which digitally displays the results of measurement and is provided with a circuit to be described later. A front panel of the display unit 20 is provided with a display section 27 using a liquid crystal, a power switch 28 and a correction screw 29 for displaying zero on the display section 27 by varying the resistance in the circuit to be described later.

FIG. 2 shows the internal structure of the body 1. Referring to this Figure, reference numeral 9 designates a bottom plate, and numeral 10 a load cell. The load cell 10 is a sensor including an electric resistance type strain gauge, the electric resistance of which is varied when a load is applied to a central projection 13 of its top 12. This change in the electric resistance is supplied to a Wheatstone bridge circuit which provides a voltage proportional to the strain. The load cell 10 has its side wall 11 fitted in a holder 15, which is secured by screws 16, 16' to the bottom plate 9. The lower cover 6 covers the outer walls of the bottom plate 9 and holder 15. The upper end of the lower cover 6 is fixed to the lower end of the upper cover 5. Leaf springs 17 and 18 have their edges secured to upper and lower portions of the inner periphery of the upper cover 5, and their central portions are secured to a load transmission rod 19. The rod 19 includes a threaded bore which extends in the axial direction. An adjusting male screw 30 is threaddedly engaged with the bore in the rod 19, and the bottom surface of one axial end of the screw 30 is in contact with the top surface of the central projection 13 of the load cell 10 when the leaf springs 17 and 18 are not displaced. A lock screw 31 is in contact with the top surface of the screw 30 to maintain this contact. The adjustment of the screw 30 and screw 31 will be described later. The upper end portion of the rod 19 has a diameter greater than the diameter of a portion, to which the leaf springs 17 and 18 are secured. The side wall of the portion noted above is formed with a male thread 32 which is screwed in a threaded female hole formed in the bottom inside surface of the load receptacle 2. When the load receptacle 2 is rotated, it is displaced upwards or downwards.

FIG. 3 is a block diagram showing a circuit for processing an electric signal from the load cell and displaying the result of processing. Referring to this Figure, reference numeral 14 designates a load cell circuit in the load cell 10 provided in the body 1.

The load cell circuit converts the load on the load cell 10 into a corresponding change in resistance and provides a voltage corresponding to the resistance change. In FIG. 3, reference numerals 33 to 37 designate circuits provided in the display unit 20 noted above. More specifically, reference numeral 33 designates a zero adjustment circuit, which causes display of zero on the display section 27 of the display unit 20 according to an output voltage from the load cell circuit 14 in the absence of load. By turning the adjusting screw 29 of the display unit 20, the resistance in the circuit is varied to cause zero display. Reference numeral 34 designates a strain amplifier for amplifying the output voltage of the load cell circuit 14 to a predetermined extent. Reference numeral 35 is a gain amplifier which makes use of a variable resistance for displaying a numerical value of digits effective for the display section 27 in correspondence to the output voltage range of the load cell circuit 14. The resistance of the gain amplifier 35 is preset in correspondence to a forecast output voltage range. Reference numeral 36 designates an A/D converter which includes a circuit for converting an output voltage into a display signal. Reference numeral 37 designates a display element provided with a liquid crystal circuit for digitally displaying a digital signal from the A/D converter 36. The display surface of the element 37 is secured to the display section 27 of the display unit 20.

Now, the operation of the above construction of the apparatus according to the invention and a method of measurement will now be described. First, the body 1 is put on a suitable support, and then the load receptacle 2 is turned to be removed from the rod 19. Next, the lock screw 31 is unscrewed from the top of the rod 19 by using a screw driver. Then, by turning the adjusting screw 29, the resistance value in the zero adjustment circuit 33 is set at zero. That is, while the circuit 33 is not operating, the power switch 28 is turned on to pass an electric current in the circuit. And, when the lower surface of the male screw 30 is in proper contact with the upper surface of the central projection 13 of the load cell 10, zero is displayed on the display section 27. In this case, it is easy to confirm proper contact by slightly tightening the screw 30, because the numerical value on the display section 27 will vary at once from zero to another value. But, when the screw 30 is not in contact with the projection 13, zero is also displayed on the section 27 due to lack of a load applied to the load cell 10. In this case, the screw 30 is moved by turning it in one direction until the screw 30 contacts with the projection 13 to display a value other than zero on the display section 27, and thereafter the screw is turned in the opposite direction (upwardly) till zero is displayed. On the other hand, when the screw 30 is in contact with the projection 13 under the condition in which the leaf springs are deformed, that is, they are not held in the horizontal position for any reason, a value other than zero is displayed on the section 27. In this case, by loosening the screw 30 until zero is displayed, the deformation of the springs is recovered and they are returned to their undeformed horizontal position. In summary, by adjusting the screw 30, proper contact of the screw and the load cell is easily obtained. And when this proper contact is adjusted, the lock screw 31 is screwed back into contact with the adjusting male screw 30 and the load receptacle 2 is also placed on the rod 19, and then the switch 28 is turned off. The axes of the seaming chuck adapter 22 and seaming chuck 200 are aligned, and the body 1 set on the spacer 21 is placed on the lifter plate 101 of the lifter 100. At this time, the body 1 is rendered to be in the most contracted state by turning the load receptacle 2 of the body 1. Then the lifter 100 is raised to a top dead center position while maintaining the axial alignment of the seaming chuck 200 and body 1. Then, the power switch 28 of the display unit 20 is turned on to pass current in the circuit. In consequence, zero should be displayed on the display section 27 of the display unit 20. If zero is not displayed, the zero adjustment circuit 33 is operated by turning the adjusting screw 29 of the display unit 20 to thereby display zero. Then, the pin 23 for turning the load receptacle is inserted into the hole 4 of the load receptacle 2 and is turned to increase the level of the load receptacle 2 so as to elongate the body 1, thus fitting the projection 3 on top of the load receptacle 2 into the recess formed in the bottom of the seaming chuck adapter 22 to align the axes of the chuck 200 and body 1. The body 1 is then further elongated, and the receptacle 2 is fine adjusted by reciprocating it, by watching the display on the display section 27 of the display unit 20, to find out a position of the load receptacle 2 right before the appearance of the display on the display unit 27. This position is read out from the scale 7 on the receptacle 2 by making use of the mark 8 on the upper cover 5. The body 1 is elongated by further turning the receptacle 2 from this position to a predetermined extent according to the scale 7. The value of the display section 27 at this time is read out, and the read-out value is set as a lifter pressure.

In this last stage, the lifter pressure is transmitted from the receptacle 2 to the rod 19 and thence to the central projection 13 of the load cell 10. The load cell circuit 14 in the load cell 10 at this time supplies an output voltage corresponding to this pressure to the strain amplifier 34. The strain amplifier 34 amplifies this voltage and supplies the resultant output to the A/D converter 36, whereby the display element 37 digitally displays a lifter pressure on the display section 27.

While the seaming chuck adapter 22 has been used to align the axes of the body 1 and chuck 200, if the body 1 is deviated when it is installed, the rod 19 experiences a moment in the direction, in which the deviation is cancelled by the leaf springs 17 and 18, for the rod 19 is supported near its center and lower end by the leaf springs.

EFFECTIVENESS OF THE INVENTION

Since the apparatus for measuring the lifter pressure according to the invention has the foregoing construction, it is possible to preclude the drawbacks due to the hydraulic oil circuit in the prior art apparatus. Further, while with the prior art apparatus it has been necessary to set the position of the eyes to the level of the pointer of the Bourdon pressure gauge to read the pointer, with the apparatus according to the invention, since the display is the digital display and the display unit can be placed separately from the body and at a position convenient for the reading of the load, the error of the reading of the load can be extremely reduced. Further, since the load transmission rod is supported near the center and lower end by leaf springs, it is possible to alleviate the influence of the deviation of the load center. Further, since the seaming chuck adapter is used, the apparatus according to the invention can be applied to any seamer having any size without alteration of the body but by merely replacing the seaming chuck adapter. Further, since the seaming chuck adapter is provided with a fitting structure, there is no possibility of eccentrically clamping the body between the lifter and chuck.

INDUSTRIAL UTILITY OF THE INVENTION

This invention is effective for use in measuring the lifter pressure in a seamer for making a double seam of a can end and a can barrel.

I claim:

1. An apparatus including a load receptacle for measuring the lifter pressure of a seamer for doubly seaming a can end to a can barrel by clamping a body and a seaming chuck adapter between a lifter plate and a seaming chuck and elongating said body to a predetermined extent, wherein said body includes a load transmission rod extending in an axial direction and a load cell engageable with one axial end of said rod, said rod being supported near a center portion and said one axial end thereof within said body by leaf springs, said rod having an opposite axial end thereof engageable with said load receptacle, said receptacle being movable in said axial direction, the rod having a threaded bore extending in said axial direction, a male screw being threadedly engaged with said bore in said rod and one axial end of screw being engageable with said load cell by rotating said screw.

2. The apparatus of claim 1, further comprising means associated with said seaming chuck adapter and said load receptacle for axial alignment thereof.

3. The apparatus of claim 2, wherein said alignment means comprises a recess in a surface of said seaming chuck adapter facing said body and a projection on a surface of said load receptacle facing said seaming chuck adapter, said recess being engageable with said projection.

4. The apparatus of claim 1, further comprising a locking screw threadedly engaged with said threaded bore in said load transmission rod, said locking screw being engageable with an axial end of said male screw which is opposite to said one axial end which is engageable with said load cell.

5. The apparatus of claim 1, wherein said load cell includes a projection on a surface thereof facing said male screw, said projection being engageable with said one axial end of said male screw.

6. The apparatus of claim 1, further comprising means for outputting an electric signal from said load cell which is proportional to a load applied to said load cell, means for amplifying said signal, means for converting said amplified signal to a digital signal and means for digitally displaying said digital signal.

7. The apparatus of claim 6, wherein said digitally displaying means further comprises means for zero adjustment thereof.

8. The apparatus of claim 1, wherein said load receptacle includes a threaded bore and an outer periphery of said opposite axial end of said load transmission rod is threadedly engaged with said bore in said load receptacle.

9. The apparatus of claim 8, wherein said bore in said load receptacle extends in said axial direction partially through said load receptacle.

10. The apparatus of claim 1, wherein said load receptacle includes radially extending holes on the outer periphery thereof for engagement with a receptacle rotation pin used to adjust the axial position of said load receptacle.

11. The apparatus of claim 1, wherein said load receptacle includes a scale thereon and said body includes a mark thereon which cooperates with said scale to provide a calibrated visual readout of the axial position of the receptacle.

* * * * *